United States Patent [19]
Shah et al.

[11] Patent Number: 5,977,245
[45] Date of Patent: *Nov. 2, 1999

[54] AUTOMOTIVE UNDERCOAT COATING COMPOSITIONS CONTAINING REACTIVE UREA/URETHANE COMPOUNDS

[75] Inventors: Rajnikant P. Shah, Holland; Sudhakar Dantiki, Toledo; Stewart Shepler, Bowling Green, all of Ohio

[73] Assignee: BASF Corporation, Southfield, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/806,573

[22] Filed: Feb. 25, 1997

Related U.S. Application Data

[63] Continuation of application No. 08/475,477, Aug. 7, 1995, abandoned, which is a continuation of application No. 08/382,732, Feb. 2, 1995, abandoned.

[51] Int. Cl.⁶ .............................. C08J 3/00; C08K 3/20; C08L 75/00; C08F 8/30
[52] U.S. Cl. .................. 524/590; 427/372.2; 427/385.5; 427/407.1; 524/507; 525/111; 525/118; 525/119; 525/123; 525/126; 525/127; 525/128; 525/455; 525/457; 525/131; 528/44; 528/48
[58] Field of Search ..................................... 524/507, 590; 525/111, 118, 119, 123, 126, 127, 128, 455, 457, 131; 528/44, 48; 427/372.2, 385.5, 407.1

[56] References Cited

U.S. PATENT DOCUMENTS

| | | | |
|---|---|---|---|
| 3,975,457 | 8/1976 | Chang et al. | 525/131 |
| 4,180,489 | 12/1979 | Andrew et al. | 428/402 |
| 4,555,535 | 11/1985 | Bednarek et al. | 524/40 |
| 5,063,091 | 11/1991 | Martorano | 427/385.5 |

Primary Examiner—Patrick D. Niland
Attorney, Agent, or Firm—Anne Gerry Sabourin

[57] ABSTRACT

Low VOC automotive sealer compositions containing reactive urea/urethane compounds are disclosed. Sealers and tintable sealers utilyzing the reactive urea/urethane compounds have improved physical properties with a faster dry times without sacrificing other desirable properties. These compositions are found to be useful for automotive refinish according to this invention.

7 Claims, No Drawings

AUTOMOTIVE UNDERCOAT COATING COMPOSITIONS CONTAINING REACTIVE UREA/URETHANE COMPOUNDS

This is a continuation of application Ser. No. 08/475,477 filed on Aug. 7, 1995, now abandoned which is a continuation of appliacation Ser. No. 08/382,732, filed on Feb. 2, 1995, now abandoned.

(A) FIELD OF THE INVENTION

The present invention relates to a automotive undercoat coating composition comprising reactive urea-urethane compounds, which can be cured at ambient conditions or which may be baked. Automotive undercoat coating compositions according to the present invention having low VOC content comprise sealer and tintable sealer formulations.

Sealers and tintable sealers utilyzing the reactive urea-urethane compounds have faster dry times and improved physical properties without sacrificing other desirable properties and are especially useful as automotive refinish undercoat coating compositions.

(B) BACKGROUND OF THE INVENTION

In order to meet EPA regulations, the use of high solids coatings having reduced amount of solvents and its application using high volume low pressure spray gun has become customary. Typically, low VOC coatings have been found to exhibit below average drying when compared to conventional automotive coatings with longer dry times and short pot life.

To apply topcoat, wet on wet over sealer, the faster dry time of the sealer is preferred and advantagenous for the painter to do more repair jobs per day. Also for the improved efficiency of the repair jobs for automotive refinish body shops, the early sanding properties of the primer is desirable.

According to one aspect of the present invention, the low VOC sealer and tintable sealer compositions with faster drying chacteristics are disclosed. These improved physical properties are achieved without sacrificing other desirable properties.

SUMMARY OF THE INVENTION

The present invention relates to a novel coating composition comprising:
 a) 5–40 percent by total weight of a crosslinkable covehicle
 b) 10 to 50 percent by total weight of an organic solvent
 c) 1 to 60 percent by total weight of a reactive urea/urethane compounds
 d) 0 to 30 percent by total weight of a reactive diluent
 e) 10 to 50 percent by total weight of isocyanate crosslinker
 f) 0 to 10 percent by total weight of additives, such as rheology control additive, flow modifiers, curing catalysts, etc.
 g) 10 to 60 percent by total weight of pigments According to one aspect of the present invention, low VOC sealer and tintable sealer compositions, with faster dry time resulting in the improved physical properties for the wet on wet application of the top coat over the sealer, are disclosed.

The coating compositions of the present invention can be used as the sealer, tintable sealer or as a primer. It is preferred to use the coatings of the present invention as a sealer or tintable sealer. Although the sealer or tintable sealer is preferred, it will be appreciated that the coatings described herein are not intended to limit the utility of the reactive urea-urethane compounds.

The sealer or tintable sealer comprises any suitable film-forming material conventionally used in this art including acrylics, alkyd, polyurethanes, polyesters and aminoplast. The sealer or tintable sealer can be deposited out of conventional volatile organic solvents such as aliphatic, cycloaliphatic and aromatic hydrocarbons, esters, ethers, ketones and alcohols including such things as toluene, xylene, butyl acetate, acetone, methyl isobutyl ketone, butyl alcohol, etc.

The resins in the sealer or tintable sealer may be either thermoplastic (e.g. acrylic lacquer systems) or thermosetting. The low VOC coating composition useful to form the sealer formulation are typically made from copolymer compositions characterized as polymerization products of ethylenically unsaturated monomers of acrylate/methacrylate derivations containing hydroxyl groups and other vinyl monomers wherein the copolymer components are combined in such a manner to give a polymer with a moderate glass transition temperature between about −3° C. to about 35° C. (using the Fox method of Tg calculation) and a relative weight average molecular weight of less than 10,000. The molecular weight is preferably from about 1,000–7,000 based on GPC using polystyrene standards. The hydroxyl number is preferably between 75 and 175 (mg KOH per gram of non-volatile resin). The acid number is preferably between 0 and 10 (mg KOH per gram of non-volatile resin). The ethylenically unsaturated monomers of acrylate/methacrylate derivations may be selected from, but are not limited to the group essentially consisting of: ethylene and/or ethylenically unsaturated alkyl (meth)acrylates such as methyl (meth)acrylate, ethyl (meth)acrylate, propyl (meth)acrylate, 2-propyl (meth)acrylate, butyl (meth)acrylate, 2-butyl(meth)acrylate, 2-methylpropyl (meth)acrylate, t-butyl (meth)acrylate, 2-ethylhexyl (meth)acrylate, cyclohexyl (meth)acrylate, lauryl (meth)acrylate, octyl (meth)acrylate, decyl (meth)acrylate, stearyl (meth)acrylate, dicyclopentadienyl (meth)acrylate, and isobornyl (meth)acrylate; aryl monomers such as styrene, alpha-methyl styrene, vinyl toluene, t-butyl styrene, benzyl (meth)acrylate, and 2-benzylethyl (meth)acrylate; hydroxy monomers such as hydroxyethyl (meth)acrylate, hydroxypropyl (meth)acrylate, hydroxybutyl (meth)acrylate, sechydroxybutyl (meth)acrylate, and hydroxyoctyl (meth)acrylate as described in related pending U.S. application Ser. No. 353,990 filed May 19, 1989 and incorporated herein by referenece.

Any substrate material can be coated with the coating composition according to the present invention. These substrate materials include such things as glass, ceramics, paper, wood, and plastic. The coating system of the present invention is particularly adapted for metal substrates, and specifically as an automotive re-finish system. The substrate may be uncoated material or can be primed. The substrate may also be coated with paint products applied at the time of manufacture. The coating composition can be applied using conventional spray equipment or high volume low pressure spray equipment resulting in a high quality finish. Other modes of application are roller coating, brushing, sprinkling, flow coating, dipping, electrostatic spraying, or electrophoresis. Exemplary metal substrates include such things as steel, aluminum, copper, zinc, magnesium and alloys thereof. The components of the compositions can be varied to suit the temperature tolerance of the substrate material.

For example, the components can be constituted for air drying (e.g. less than 100° F.), low temperature cure (e.g. 100° F.–180° F.), or high temperature cure ( e.g. over 180° F.).

The reactive urea/urethane oligomeric compounds useful according to this invention include those described and claimed in detail in copending application Ser. No. 08/174,639, filed Dec. 28, 1993 and incorporated herein by reference as well as the topcoat formulations as described in related patent applications Ser. No. 08/174634, filed Dec. 28, 1993 and herein incorporated by reference.

DESCRIPTION OF PREFERRED EMBODIMENT

The present invention relates to a novel coating composition comprising:

a) 5–40 percent by total weight of a crosslinkable co-vehicle, b) 10 to 50 percent by total weight of an organic solvent, c) 1 to 60 percent by total weight of a reactive urea/urethane compounds, d) 0 to 30 percent by total weight of a reactive diluent, e) 10 to 50 percent by total weight of a isocyanate crosslinker, f) 0 to 10 percent by total weight of additives such as rheology control additives, flow modifiers, curing catalysts, etc.

g) 10 to 60 percent by total weight of pigments.

According to one aspect of the present invention, low VOC sealer compositions, with faster dry time resulting in the improved physical properties for the wet on wet application of the top coat over the sealer, are disclosed.

The coating compositions of the present invention can be used as a sealer or tintable sealer or primer. It is preffered to use the coatings of the present invention as a sealer or tintable sealer. Although the sealer or tintable sealer is preferred, it will be appreciated that the coatings described herein are not intended to limit the utility of the reactive urea/urethane compounds (RUU).

Especially preferred are low VOC sealer or tintable sealer comprising about 10 to 40 percent by total weight of a crosslinkable co-vehicle, 10 to 40 percent by total weight of solvents, 1 to 40 percent by total weight of the reactive urea/urethane compound, 0 to 30 percent by total weight of reactive diluent, 10 to 50 percent by total weight of isocyanate crosslinking agent, 0 to 10 percent by total weight of additives such as accelerators, flow modifiers, anti-settling agents, wetting agents, dispersing aids and mar and slip agents, etc. and 20 to 50 percent by total weight of pigments.

A useful crosslinkable co-vehicle can essentially consist of the polymerization product of ethylenically unsaturated monomers of acrylate or methacrylate derivations containing hydroxyl groups and other vinyl monomers wherein the copolymer components are combined in such a manner to give a polymer with a moderate glass transition temperature between about –3° C. to about 35° C. (using the Fox method of Tg calculation) and a relative weight average molecular weight of less than 10,000. The molecular weight is preferably from about 1,000–7,000 based on GPC using polystyrene standards. The hydroxyl number is preferably between 75 and 175 (mg KOH per gram of non-volatile resin). The acid number is preferably between 0 and 10 (mg KOH per gram of non-volatile resin). The ethylenically unsaturated monomers of acrylate/methacrylate derivations may be selected from, but are not limited to the group essentially consisting of: ethylene and/or ethylenically unsaturated alkyl (meth)acrylates such as methyl (meth) acrylate, ethyl (meth)acrylate, propyl (meth)acrylate, 2-propyl (meth)acrylate, butyl (meth)acrylate, 2-butyl (meth)acrylate, 2-methylpropyl (meth)acrylate, t-butyl (meth)acrylate, 2-ethylhexyl (meth)acrylate, cyclohexyl (meth)acrylate, lauryl (meth)acrylate, octyl (meth)acrylate, decyl (meth)acrylate, stearyl (meth)acrylate, dicyclopentadienyl (meth)acrylate, and isobornyl (meth)acrylate; aryl monomers such as styrene, alpha-methyl styrene, vinyl toluene, t-butyl styrene, benzyl (meth)acrylate, and 2-benzylethyl (meth)acrylate; hydroxy monomers such as hydroxyethyl (meth)acrylate, hydroxypropyl (meth) acrylate, hydroxybutyl (meth)acrylate, sec-hydroxybutyl (meth)acrylate, and hydroxyoctyl (meth)acrylate.

Another useful crosslinkable co-vehicle can essentially consist of the polymerization product of ethylenically unsaturated monomers of acrylate/methacrylate derivations containing vinyl monomers wherein at least one of the vinyl monomers is glycidyl or acid functional, and optionally vinyl monomers containing hydroxyl groups wherein the copolymer components are combined in such a manner to give a polymer with a moderate glass transition temperature between about –3° C. to about 35° C. (using the Fox method of Tg calculation) and a relative weight average molecular weight of less than 10,000 preferably from about 1,000–7,000 based on GPC using polystyrene standards. The hydroxyl number is preferably between 75 and 175 (mg KOH per gram of non-volatile resin). The acid number is preferably between 5 and 15 (mg KOH per gram of non-volatile resin). The ethylenically unsaturated monomers of acrylate/methacrylate derivations may be selected from but not are not limited to the group essentially consisting of: ethylene and/or ethylenically unsaturated monomers alkyl (meth)acrylates such as methyl (meth)acrylate, ethyl (meth) acrylate, propyl (meth)acrylate, 2-propyl (meth)acrylate, butyl (meth)acrylate, 2-butyl(meth)acrylate, 2-methylpropyl (meth)acrylate, t-butyl (meth)acrylate, 2-ethylhexyl (meth) acrylate, cyclohexyl (meth)acrylate, lauryl (meth)acrylate, octyl (meth)acrylate, decyl (meth)acrylate, stearyl (meth) acrylate, dicyclopentadienyl (meth)acrylate, and isobornyl (meth)acrylate; aryl monomers such as styrene, alpha-methyl styrene, vinyl toluene, t-butyl styrene, benzyl (meth) acrylate, and 2-benzylethyl (meth)acrylate; hydroxy monomers such as hydroxyethyl (meth)acrylate, hydroxypropyl (meth)acrylate, hydroxybutyl (meth)acrylate, sec-hydroxybutyl (meth)acrylate, and hydroxyoctyl (meth) acrylate; acid functional monomers such as acrylic acid, methacrylic acid, maleic acid, and itaconic acid; glycidyl functional monomers such as glycidyl (meth)acrylate. Optionally this crosslinkable co-vehicle may be subsequently or in situ reacted to a fatty acid through glycidyl groups on the polymer or reacted to an oxirane functional compound through organic acid groups on the polymer.

The crosslinkable co-vehicle can also consist essentially of an acrylic polymer partially esterified by means of a natural or synthetic fatty acid, obtained from the following classes with relative proportions of 1) 5% to 60% by weight of groups originating from the olefinic polymerization of styrene or of a-methyl- styrene or of vinyl toluene.

2) 10% to 70% by weight of groups originating from the olefinic polymerization of a hydroxyalkyl acrylate or methacrylate in which the alkyl group contains 2 to 12 carbon atoms and preferably from 2 to 6 carbon atoms.

3) 5% to 60% by weight of groups originating from the olefinic polymerization of one or more alkyl mono-, di-, or triacrylates or methacrylates, in which the alkyl group contains 2 to 18 carbon atoms and preferably from 2 to 6 carbon atoms, characterized in that it comprises successively a) an olefinic polymerization carried out without a chain transfer agent in a solvent between 140° C. and 160° C. with a free radical initiator catalyst and, b) a partial esterification in a solvent between 165° C. and 185° C. with an esterificaltion catalyst; the said polymer being partially esterified, on its hydroxyl groups, by means of a saturated or unsaturated synthetic or optionally modified natural fatty acid. The quantity of fatty acid employed representing from 10% to 25% by weight of the said partially esterified polymer with a final product having a hydroxyl number of between 100 and 160 (mg KOH per gram of non-volatile resin), and an acid number of 0 to 10 (mg KOH per gram of non-volatile resin).

The crosslinkable covehicle can be acrylic, polyester, acrylester or urethane resin containing functional groups such as hydroxyl, carboxyl and amino functional groups.

The reactive urea/urethane compounds useful according to this invention are described and claimed in copending application Ser. No. 08/174.634 filed Dec. 28, 1993 and incorporated herein by reference. These urea/urethane compounds typically are aromatic, aliphatic, or cycloaliphatic ureas or urea/urethanes containing reactive groups other than isocyanate groups. Utility is also in topcoat formulations described in related patent application Ser. No. 08/174, 634 filed Dec. 28, 1993 and incorporated herein by reference.

A urea/urethane compound is a low molecular weight polymer with a degree of polymerization less than ten. The term urethane describes the reaction product of isocyanate and hydroxyl and the urea is the product of isocyanate with amines such as primary and secondary amines. These materials may be referred to as reactive urea/urethane compounds because they contain reactive groups other than isocyanate which can be used to crosslink with other compounds containing isocyanates, amines, and other crosslinking agents known to the art. Reactive urea/urethane compounds may have primary, secondary, or tertiary hydroxyl groups; primary, secondary, or tertiary amine groups; carboxyl groups, oxirane groups and may contain unsaturation as well as other reactive constituent groups. These reactive urea/urethane compounds are essentially free of isocyanate groups, are of low to medium molecular weight, and contain free reactive groups other than isocyanates. These free reactive groups are especially useful to provide for crosslinking in coatings. Reactive urea-urethane compounds so produced are especially useful in coating compositions and in particular in auto refinish undercoat coating compositions. For example, the components can be constituted for air drying (e.g. less than 100° F.), low temperature cure (e.g.100° F.–180° F.), or high temperature cure (e.g. over 180° F.), or radiation cured coatings.

The present invention relates to novel hydroxyl functional urea/urethane compounds, their preparation and use. In particular, the present invention relates to a process for the production of compounds containing reactive groups and to the reactive compounds produced thereby. Primary hydroxyl groups are especially useful reactive groups and are especially useful on polymers for use in refinish paint compositions. The preferred urea/urethane compounds are referred to as reactive urea/urethane compounds because they contain reactive groups such as the preferred hydroxyl groups. Reactive groups such as carboxyl, epoxy, mercaptan, alkoxysilane, etc. may also be useful on urea/urethane compounds for use in refinish paint compositions.

The present invention also relates to a process for the production of urea/urethane compounds containing reactive groups such as the preferred primary hydroxyl groups. The products are referred to as reactive urea/urethane compounds because they contain reactive groups such as hydroxyl groups which can be used to cross link with other compounds containing isocyanates. An urea/urethane compound is a low molecular weight polymer with a degree of polymerization less than ten.

The reactive urea/urethane compounds of the present invention are especially useful in automotive refinish coating compositions. These coatings can be designed as air-dry, oven bake or radiation cured coatings. The coating compositions of the present invention typically comprise the following:

(i) a principal resin such as an acrylic, polyester, acrylester or urethane resin containing functional groups such as hydroxyl, carboxyl, and amino functional groups.

(ii) a reactive urea/urethane compound compatible with the principal resin.

(iii) Isocyanate curing agent (iv) pigments including corrossion inhibitors and extender pigments (v) solvents known in the coating art.

(vi) and optionally, additives such as accelerators, antisagging agents, flow modifiers, driers, antisettling agents, wetting agents, etc., (vii) optionally, a reactive diluent The reactive urea/urethane compounds typically combine the reaction product of an isocyanate with an alkanolamine that can be represented as:

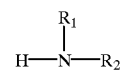

where $R_1$=alkyl or cycloaliphatic or benzylic moiety with a hydroxyl group.

$R_2$=Hydrogen or alkyl or cycloaliphatic or benzylic moiety with or without a hydroxyl group.

$R_1+R_2$ should consists of less than or equal to 12 carbon atoms.

Suitable amines are the alkanolamines. The alkanolamine useful in this invention should consists of a total of 12 or less carbon atoms. Higher number of carbon atoms in the alkanolamines would change the flexibility and physical drying characteristics of the final coating product and make it less desirable in the coating application. Alkanolamines include but are not limited to: 2-(propylamino)ethanol, 2-(Methylamino)ethanol, 2-(Ethylamino)ethanol, 2-(t-Butylamino)ethanol, 2-(n-Butylamino)ethanol, Diisopropylamine and Diethanolamine.

Suitable polyisocyanates useful in the invention include isophorone diisocyanate, tetramethyl xylene diisocyanate, dicyclohexylmethane-4,4'-diisocyanate, the isocyanurate of isophorone diisocyanate and the isocyanurate of hexamethylenediisocyanate. More specifically the present reactive urea/urethanes relate to the reaction product of an isocyanate preferably a triisocyanurate or a trimer, with a multifunctional chemical reagent containing at least one group with an active hydrogen atom. Typical isocyanates useful in the invention include isophorone diisocyanate, tetramethyl xylene diisocyanate, dicyclohexylmethane-4,4'-diisocyanate, trimer of tetramethylxylene diisccyanate, triisocyanurate of isophorone diisocyanate, and triisocyanurate of hexamethylene diisocyanate. Some commercial examples of the isocyanates useful in this invention including but not limited to, Vestanat T1890 (Huels America), Desmodur Z-4370 (Miles Inc.) Tolonate HDT (Rhone-Poulenc Inc.) and Cythane 3160 (American Cyanamid). T1890 and Z-4370 are both based on isophorone diisocyanate (IPDI) and Cythane 3160 is based on tetramethyl xylene diisocyanate, Tolonate HDT based on hexamethyl diisocyanate.

In addition, aliphatic, aromatic and/or other groups can also be incorporated into the urea/urethane compound by the reaction of —N=C=O groups on the polyisocyanate with other reactants containing abstractable hydrogens such as alcohols.

The reactive urea/urethane compounds preferably contain primary hydroxyl groups, low molecular weight, preferably with a weight average molecular weight less than 6000, as measured by gel permeation chromatoiyraphy relative to polystyrene standards, a low polydispersity, preferably less than 2.0, and a high Tg or hardness.

Aliphatic, aromatic and/or other groups can also be incorporated into the urea/urethane compound by the reaction of —N=C=O groups on the polyisocyanate with other reactants containing abstractable hydrogens such as alcohols.

Solvents of utility, in the coating composition are those commonly used in the art. They include but are not limited to ketones such as methyl ethyl ketone, methyl n-amyl ketone, methyl isobutyl ketone, methyl hexyl ketone, methyl propyl ketone, methyl isoamyl ketone,etc., esters such as ethyl acetate, n-butyl acetate, 3-methoxy n-butyl acetate, etc., alcohols such as n-butyl alcohol, ethanol, propanol, etc., aromatics such as toluene, xylene, glycol ethers such as ethylene glycol monoethyl ether, ethylene glycol monobutyl ether, propylene glycol monomethyl ether, dipropylene glycol monoethyl ether, etc., glycol esters such as propylene glycol monomethyl ester acetate, ethylene glycol butyl ether acetate, and the like.

Isocyanate crosslinking agents of utility in these coatings are essentially those commonly used in the art. They include but are not limited to isocyanate functional adducts, biurets, isocyanurates, uretdiones, allophanates of toluene diisocyanate, hexamethylene diisocyanate, isophorone diisocyanate and metatetramethyl xylene diisocyanate. The preferred index between the isocyanate groups and the total of all reactive groups contained in the coating with which isocyanates may react, is 0.5 to 2.5 on a molar basis.

Reactive diluents useful in these formulations are materials that provide an increase in solids to the formulation with a lower contribution to the application viscosity than the normal system crosslinkable covehicle. These reactive diluents may be polyesters, polyurethanes, alkyds, caprolactone derived polyols, acrylics, or any other material known to the art. The functionality can likewise be any known to the art, such as, primary, secondary, or tertiary hydroxyl, primary, secondary, or tertiary amine, oxazolidines, aldimines or ketimines of primary amines. Some examples of these materials are Union Carbide's caprolactone derived Tone series such as Tone 200, Tone 210, Tone 301, Tone 305, Tone 310; Inolex Chemical's Lexorez series such as Lexorez 1100-220, Lexorez 1140-190, Lexorez Z-130, Lexorez 3500, Lexorez 1400; Miles' Desmophen 670-B80, Desmophen XP-7052E and XP-7053 from Miles, Rohmi and Haas' QM-1007, CasChem's Caspol series such as Caspol 1715, Caspol 1842, Caspol 1962, Caspol 5002, aldimine A-139 from Huls, etc.

Additives of utility in these coatings are those commonly used in the art. Mar and slip agents and defoamers which find utility included but are not limited to Byk 141, Byk 304, Byk 306, Byk 307, Byk 325, Byk 331, Byk 341, Dow Corning #7, Dow Corning #54, Dow Corning #200, General Electric SF-69, Troy Chemical Troysol S366, Troy Chemical TroysolAFL, Tego Glide 410, Miles OL44.

Additives also finding utility are curing catalysts which include but are not limited to organic-metallic compounds such as dibutyltindioxide, dibutyltindilaurate, zinc octoate, amine compounds such as triethylamine, 2-diethylaminoethanol, triethylenediamine.

Also finding utility are flow and rheology modifying agents which include but are not limited to synthetic amorphous hydrophobic silica such as Degussa Aerosil R972, synthetic amorphous hydrophilic silica Degussa Aerosil 200, organo clays, polyethylene wax dispersions, polypropylene wax dispersions, polyamid wax dispersions, ethylene vinyl acetate wax dispersions. Agents such as Byk Anti-terra 202, Byk Anti-terra 204, Byk Anti-terra V, Byk W-960, Byk R-405, Byk-P104, Byk P-104s; Troy Chemical Troythix Antisag 4, Troy Chemical Troythix Antisettle; Raybo Chemical Raybo 6, Raybo Chemical Raybo 94, and Tego Chemie ZFS 460.

Also finding utility are pigment wetting and dispersing aids which include but are not limited to ICI Solsperse hyperdispersants such as Solsperse 5000, Solsperse 12000, Solsperse 22000 and Solsperse 24000; Troy Chemical Troysol CD1, Troy Chemical Troysol CD2 and Troy Chemical Troysol 98C; Daniel Products DispersAyd 9100; Raybo Chemical Raybo 63; Byk Anti-terra U, Byk Anti terra 202, Byk W-960, Byk P-104 Disperbyk 160, Disperbyk 162, Disperbyk 163; Nuodex Nuosperse 657; Nuodex Nuosperse 700, soya lecithin, etc.

Also finding utility in these coatings are various types pigments common to the art which include but are not limited to titanium dioxide, graphite, carbon black, zinc oxide, cadmium sulfide, chromium oxide, lead cyanamide, lead silico chromate, chromium oxide, zinc sulfide, yellow nickel titanium, yellow chromium titanium, red iron oxide, transparent red iron oxide, yellow iron oxides, transparent yellow oxide, black iron oxide, naphthol reds and browns, anthraquinones, dioxazine violet, isoindoline yellows, arylide yellow and oranges, ultramarine blue, phthalocyanine complexes, amaranth, quinacridones, halogenated thioindigo pigments, extender pigments such as mica, magnesium silicate, aluminum silicate, calcium silicate, calcium carbonate, fumed silica, barium sulfate, Wollastokup ES-10, wollastokup 1100-4, blanc fixe, corrosion inhibitors such as zinc phosphate, strontium phosphate, zinc molybdate, zinc chromate, strontium chromate, barium chromate, orthophosphates, phosphosilicates, phosphate esters, etc.

The pigments can be introduced by first forming a millbase with the hydroxy functional resin utilized in the composition or with other compatible polymers by conventional techniques, such as sand grinding, ball milling, attritor grinding, two roll milling and the like, to disperse and grind the pigments. The mill base is then blended with the other film forming constituents as shown in the sealer example in the patent.

The coating composition can be applied using conventional spray equipment or high volume low pressure spray equipment resulting in a high quality finish. Other modes of application are roller coating, brushing, sprinkling, flow coating, dipping, electrostatic spraying, or electrophoresis. Exemplary metal substrates include such things as steel, aluminum, copper, zinc, magnesium and alloys thereof. The components of the compositions can be varied to suit the temperature tolerance of the substrate material. For example, the components can be constituted for air drying (e.g. less than 100° F.), low temperature cure (e.g.100° F.–180° F.), or high temperature cure (e.g. over 180° F.). The coatings may be formulated to meet the requirements of the equipment intended for use during application.

The following examples are given to illustrate the low VOC undercoat coatings according to present invention. In the examples, dry time of the sealer using Byk Dry Time Recorder, the measure of Distinctness of Image (DOI) and 20° gloss of the top coat, sprayed wet on wet over the sealer, were used to determine the rate of dry time of the sealer and strike-in resistance of the top coat.

Strike-in Resistance of the Coating

This phenomenon usually occurs when the subsequent coating applications were done wet on wet i.e. the undercoat film is not cured chemically but only physically dried before the application of the subsequent coating. If the undercoating film is not dried enough then the solvents from the second coating destroys the integrity of the undercoating film, resulting in the poor ovearll appearance with poor gloss and DOI. Application of clearcoat over basecoat or topcoat over sealer are some of the examples where this may occur.

Distinctness of Image

This test is used in an attempt to quantify the appearance of a film. Procedure is: place the panel under the D.O.I. machine; turn on the machine; look up and down the scale (0–100) to find the position at which half of the "c"'s appear to be open and half closed. Record this number. It is important to maintain the same distance and angle from the machine for each test. The D.O.I. meter can be available commercially from suppliers such as Byk company.

Synthesis of Reactive Urea-urethane Compound #1 (RUU #1)

This example of these invention, from the copending application, utilized two reactions including one to make an intermediate.

I. Intermediate
1. Composition:
A.  Vestanat T-1890 E        738.6     (Huls-IPDI isocyanurate,
                                          70% NV, 12% —N=C=O)
    n-Butyl acetate            175.6    (urethane grade)
    Octadecanol                 80.3
    Triisodecylphosphite         1.0
B.  Dibutyltin dilaurate        0.0056
    n-Butyl acetate              4.5    (urethane grade)
2. Process:
A.  Add components "A" to reactor and heat to 65–75 C.
B.  At 65–75 C., add components "B" and hold until the % NCO
    becomes constant.
C.  Cool and store Intermediate under Nitrogen until
    needed.
II. Finished Urethane/Urea Compound
1. Composition:
A.  2-(t-Butylamino)ethanol    146.2
    n-Butyl acetate            126.5    (urethane grade)
B.  Intermediate               723.0    (from I)
C.  n-Butyl acetate              4.3    (urethane grade)
2. Process:
A.  Add component "A" to reactor and heat to 50 C.
B.  Add component "B" to reactor over 180 minutes.
C.  Flush with component "C" then hold at temperature until
    % NCO = 0 (ASTM D2572-87).

The properties of the RUU compound was as follows. The weight percent non-volatile was 59.3% (ASTM 2369). The Gardner Halt viscosity at 25° C. was Z5. The hydroxyl number was 100 (mg of KOH per gram of nonvolatile resin). The weight average molecular weight was approximately 2100 (GPC based on polystyrene standards).

Synthesis of Reactive Urea/Urethane (RUU) #2

This example of the invention, from the copending application, utilized two reactions including one to make an intermediate.

I. Intermediate
1. Composition:               grams
A.  Vestanat T-1890 E        797.47    (Huls-IPDI isocyanurate,
                                          70% NV, 12% —N=C=O)
    n-Butyl acetate           157.87   (urethane grade)
    2-ethyl hexanol            41.73
    Triisodecylphosphite        1.0
B.  Dibutyltin dilaurate        0.006
    n-Butyl acetate             1.33   (urethane grade)
2. Process:
A.  Add components "A" to reactor and heat to 65–75 C.
B.  At 65–75 C., add components "B" and hold until the % NCO
    becomes constant.
C.  Cool and store Intermediate under Nitrogen until
    needed
II. Finished Urethane/Urea Compound
1. Composition:               grams
A.  2-(n-Butylamino)ethanol   155.33
    n-Butyl acetate           100.0    (urethane grade)
B.  Intermediate              736.53   (from I)
C.  n-Butyl acetate             8.13   (urethane grade)
2. Process:
A.  Add component "A" to reactor and heat to 50 C.
B.  Add component "B" to reactor over 180 minutes.
C.  Flush with component "C" then hold at temperature until
    % NCO = 0 (ASTM D2572-87).

The properties of the RUU compound was as follows. The weight percent non-volatile was 63.2% (ASTM 2369). The Gardner Holt viscosity at 25° C. was Z6+. The hydroxyl number as determined per was 114 (mg of KOH per gram of nonvolatile resin). The weight average molecular weight was approximately 2050 (GPC based on polystyrene standards).

Synthesis of Acrylic Resin #1

(Parts are by weight and do not include transfer or process loss) A mixture of 2363 parts of methyl n-amyl ketone and 336 parts of methyl ethyl ketone was added to a reactor. The reactor was purged with nitrogen. A nitrogen feed and mixing was maintained on the reactor throughout the synthesis. The mixture was heated to reflux (approximately 125 to 131 degrees Celsius). Premix #1, 65% of premix #2, and premix #3, listed below, was added to the reactor concurrently in separate feed streams over a period of about 150 minutes.

Premix #1 was 3047 parts of normal butyl methacrylate, 4116 parts of styrene, 1844 parts of hydroxyethyl methacrylate, 1148 parts of glacial acrylic acid and 153 parts of methyl n-amyl ketone.

Premix #2 was 246 parts of VAZO 88 (1,1'-azobis (cyanocyclohexane)) and 1429 parts of methyl ethyl ketone.

Premix #3 was 504 parts of 2-mercaptoethanol and 305 parts of methyl n-amyl ketone.

The polymerization was carried out at reflux with the temperature dropping throughout the addition of reactants. Subsequently 225 parts of methyl n-amyl ketone was used to flush feed pumps and lines for premix numbers 1 and 3. The remainder of premix #2 was added over a period of 60 minutes immediately after the 150 minute addition. The temperature decreased over this addition of the VAZO 88.

Subsequently 269 parts of methyl n-amyl ketone was used to flush the feed pump and lines for premix number 2. After a hold of 10 minutes, the reactor was configured with a Barrett trap. The solvent was stripped to a temperature of about 136 degrees Celsius. Then 3493 parts of Cardura E-10 (glycidal ester of Versatic 10 carboxylic acid) and 30 parts of methyl n-amyl ketone was charged into the reactor. The mixture was again heated to reflux (approximately 150 to 151 degrees Celsius). The reactor was held at reflex for three hours, cooled and 710 parts of methyl ethyl ketone added.

The properties of the resin were as follows. The weight percent non-volatile was adjusted to 76% (ASTM 2369) with MEK, the acid number on solids was 9. The Gardner Halt viscosity at 25 degrees Celsius when reduced to 66.4 weight percent with methyl ethyl ketone was J to L. The hydroxyl number was 144 (mg of KOH per gram of non-volatile resin). The weight average molecular weight was approximately 4000 (GPC based on polystyrene standards).

Synthesis of Acrylic Resin #2

A flask fitted with an agitator, two addition feed pumps, a reflux condenser, a thermocouple probe, a heating mantle and an inert gas inlet was charged with 644.8 grams of methyl isoamyl ketone. The flask was purged with nitrogen. An inert atmosphere and mixing was maintained on the flask throughout the synthesis. The flask was heated to reflux (approximately 140 to 142 degrees Celsius). Each of the following premix solutions were added to the flask at a steady rate over a period of four hours.

Premix #1 was 126.3 grams of ethyl methacrylate, 485.6 grams of hydroxyethyl methacrylate, 199.2 grams of methyl methacrylate, and 451.7 grams of styrene.

Premix #2 was 86.0 gram; of t-butyl peroctoate, and 38.9 grams of VM+P naphtha.

The polymerization was carried out at reflux with the reflux temperature dropping throughout the addition of reactants to 136 degrees Celsius. After all material from premix #1 was added, 31.2 grams of methyl isoamyl ketone was used to rinse the addition apparatus into the flask. The flask was held at reflux for 30 minutes, then the following premix was added over a period of 5 minutes through addition pump #2.

Premix #3 was 2.1 grams of t-butyl peroctoate, and 14.8 grams of methyl isoamyl ketone.

Addition apparatus #2 was then rinsed into the flask with 4.8 grams of methyl isoamyl ketone. The flask was then held at reflux for 3.5 hours. The following premix was then added over a period of 5 minutes through addition apparatus #2.

Premix #4 was 0.5 grams of Fascat 4100, and 2.8 grams of methyl isoamyl ketone.

The addition apparatus was then flushed into the flask with 2.6 grams of methyl isoamyl ketone. At this point, the reflux temperature of the flask was 135 to 140 degrees Celsius. The flask was fitted with a Barrett trap and solvent was stripped from the flask until the flask reached a temperature of 182 degrees Celsius. Then 208.9 grams of soya fatty acid was placed into addition apparatus #1 and addition was started into the flask and was carried oat at a steady rate over a period of 60 minutes. The solvent strip continued until the reflux temperature reached 184 to 188 degrees Celsius. The amount of solvent removed was about 18.9% of the batch. At this point the Barrett trap was emptied of distillate and charged with xylene. Reflux was maintained at 184 to 188 degrees Celsius while removing the water of esterification. The theoretical amount of water removed is 0.42%, or 13.4 grams for this batch size. When 75% of the theoretical water amount was removed the following endpoint control was started.

| SOLVENT BLEND | | REDUCTION | |
|---|---|---|---|
| n butyl acetate | 30% | batch | 50 grams |
| xylene | 10% | solvent blend | 27 grams |
| VM + P naphtha | 50% | | |

The batch was complete when the acid value on solution was less than 2. The batch was then cooled and thinned with the following. VM+P naphtha 462.1 grams, n-butyl acetate 295.9 grams. The weight solids were then adjusted to 60.0% with n-butyl acetate (approximately 122 grams).

The properties of the resin were as follows. The weight percent non-volatile was 60% (ASTM 2369), the acid number on solids was less than 2. The Gardner Halt viscosity at 25° C. was Z–Z1. The hydroxyl number was 112 (mg of KOH per gram of non-volatile resin). The weight average molecular weight was approximately 13500 (GPC based on polystyrene standards).

Catalyst Solution #1

The following materials were combined under agitation, 5.0 grams of dibutyl tin dilaurate and 495 grams of methyl amyl ketone.

Catalyst Solution #2

The following materials were combined under agitation, 5.0 grams of dibutyl tin dilaurate and 495 grams of xylene.

Bentone Slurry #1

Followings were added under agitation, 104.348 grams of methyl hexyl ketone, 154.224 grams of methyl amyl ketone, 34.0 grams of bentone 27, 8.536 grams of Anti Terra U, 88.892 grams of methyl amyl ketone. The solution was mixed at high speed with cowels blade, using pnuematic disperser, till homogenious solution.

Reducer #1

The following solvents were combined under agitation, 177.5 grams of methyl n-amyl ketone, 645.0 grams of methyl n-propyl ketone, and 177.5 grams of methyl n-hexyl ketone.

Reducer #2

The following solvents were combined under agitation, 640.0 grams of methyl n-amyl ketone, 60.0 grams of Exxate 800 and 300.0 grams of Exxate 600.

Composite #1

The following were mixed with agitation, 2.0 grams of catalyast solution #2 with 80.0 grams of methyl hexyl ketone.

Composite #2

The followings were mixed with agitation, 141.05 grams of acrylic resin #2, 54.1 grams of methyl n-amyl ketone, 48.0 grams of methyl hexyl ketone and 2.2 grams of catalyst solution #2.

Isocyanate Hardner #1

An isocyanate hardener solution was prepared as follows. Under a inert, anhydrous atmosphere, 430.0 grams of hexamethylene diisocyanate isocyanurate was mixed with 70.0 grams of urethane grade methyl n-amyl ketone. This mixture was filled into closed containers under an inert anhydrous atmosphere.

Isocyanate Hardener #2

An isocyanate hardener solution was prepared as follows. Under a inert, anhydrous atmosphere, 232.0 grams of hexamethylene diisocyanate isocyanurate (low viscosity-LV), 628.0 grams of Desmodur N-3400 (Miles), 140.0 grams of methyl n-amyl ketone were mixed. This mixture was filled into closed container under an inert anhydrous atmosphere.

Isocyanate Hardener #3

An isocyanate hardener solution was prepared as follows. Under a inert, anhydrous atmosphere, 710.0 grams of hexamethylene diisocyanate isocyanurate, 289.0 grams of urethane grade methyl n-amyl ketone and 1.0 gram of catalyst solution #2 were mixed under agitation. This mixture was filled into closed container under an inert anhydrous atmosphere.

Sealer Paste #1

A sealer paste was prepared as follows. A 4 liter mixing pot suitable for use on a high speed disc impeller was secured to a high speed disc impeller mixer and 575.5 grams of Acrylic resin #1 were charged into the pot. The following materials were added under moderate mixing, 56.23 grams of methyl amyl ketone, 220.33 grams of bentone 27 slurry, 59.92 grams of Shell Epon 1001-X-75, 2.7 grams of soya lecithin, 2.74 grams of Monsanto's modaflow resin modifier, 4.6 grams of Rheox MPA 2000X. These materials were mixed at moderate speed until homogeneous (approximately 10 minutes). Then, 329.58 grams of Mineral Pigments Zinc Phosphate J-0852, 194.77 grams of Bakertalc HI-Talc A-3, 374.55 grams of Engelhard ASP-600, 509.37 grams of Hitox Bartex 65, and 89.89 grams of Dupont Tipure R-960 Titanium Dioxide pigment were added under moderate mixing and mixed until homogeneous. The mixer was then increased in speed to give a peripheral blade velocity of approximately 5000 lineal feet per second. This mixing was maintained for a period of fifteen minutes. The premix was then cooled to room temperature and the viscosity was adjusted to approximately 115 KU with methyl amyl ketone. This adjustment required approximately 19.47 grams of methyl amyl ketone. The premix was then passed through a suitable laboratory small media mill (Eiger 'Mini' motormill 250 or similar) until a grind fineness of 18 to 20 microns was achieved (as determined on a Hegman grind gauge).

Sealer Paste #2

A sealer paste was prepared as follows. A 2 liter mixing pot suitable for use on a high speed disc impeller was secured to a high speed disc impeller mixer and 265.839 grams of Acrylic resin #1 were charged into the pot. The following materials were added under moderate mixing, 16.59 grams of methyl hexyl ketone, 73.675 grams of methyl amyl ketone, 28.471 grams of bentone slurry #1, 22.433 grams of Shell Epon 1001-X-75, 5.8 grams of soya lecithin, 4.178 grams of Monsanto's modaflow resin modifier, 15.02 grams of Rheox MPA 2000X. These materials were mixed at moderate speed until homogeneous (approximately 10 minutes). Then, 276.288 grams of Mineral Pigments Zinc Phosphate J-0852, 168.175 grams of Novicite L-207 from Malvern Minerals, 144.149 grams of Engelhard ASP-600, 312.332 grams of Hitox Bartex 65, 72.081 grams of Dupont Tipure R-960 Titanium Dioxide pigment, 156.166 grams of Wollastokup ES 10 from NYCO and 12.188 grams of Purmol 3ST from Zeochem were added under moderate mixing and mixed until homogeneous. The mixer was then increased in speed to give a peripheral blade velocity of approximately 5000 lineal feet per second. This mixing was maintained for a period of 30 minutes. The premix was then cooled to room temperature and the viscosity was adjusted to approximately 118 KU with methyl amyl ketone. This adjustment required approximately 52.336 grams of methyl amyl ketone. The premix was then passed through a suitable laboratory small media mill (Eiger 'Mini' motormill 250 or similar) until a grind fineness of 20 to 22 microns was achieved (as determined on a Hegman grind gauge).

Sealer Paste #3

A sealer paste was prepared as follows. A 2 liter mixing pot suitable for use on a high speed disc impeller was secured to a high speed disc impeller mixer and 665.0 grams of Acrylic resin #2 were charged into the pot. The following materials were added under moderate mixing, 57.30 grams of methyl hexyl ketone, 102.60 grams of methyl amyl ketone, 59.632 grams of xylene, 101.27 grams of Shell Epon 1001-X-75, 18.40 grams of Anti Terra U, 3.8 grams of Monsanto's modaflow resin modifier and 18.50 grams of Troythix Antisettling agent from Troy Chemical. These materials were mixed at moderate speed until homogeneous (approximately 10 minutes). Then, 475.0 grams of Phosguard from Mineral Pigment, 285.0 grams of Novicite L-207 from Malvern Minerals, 190.0 grams of Engelhard ASP-600, 570.0 grams of Hitox Bartex 65, 380.0 grams of Dupont Tipure R-960 Titanium Dioxide pigment and 2.0 grams of Lamp Black 101 from Degussa were added under moderate mixing and mixed until homogeneous. The mixer was then increased in speed to give a peripheral blade velocity of approximately 5000 lineal feet per second. This mixing was maintained for a period of 30 minutes. The premix was then cooled to room temperature and the viscosity was adjusted to approximately 104 KU with methyl amyl ketone. This adjustment required approximately 20.40 grams of methyl amyl ketone. The premix was then passed through a suitable laboratory small media mill (Eiger 'Mini' motormill 250 or similar) until a grind fineness of 20 to 22 microns was achieved (as determined on a Hegman grind gauge).

Preparation of Sealers

Six sealers were prepared as follows. All the ingredients were added under agitation and after completion of their addition, the sealers were mixed for 10 minutes till homogeneous mixture. Sealer #1, 3 and 5 were "control", without RUU compounds while sealer, #2,4 and 6 were made using RUU compounds replacing about 20%, 26% and 20% of the solids by weight of the acrylic resin used for sealer #1,3 and 5 respectively.

|  | sealer #1<br>without RUU | sealer #2<br>with RUU |
| --- | --- | --- |
| methyl hexyl ketone | 19.22 grams | 19.22 grams |
| acrylic resin #1 | 24.00 grams | 7.71 grams |

-continued

| | | |
|---|---|---|
| RUU compound #1 | 0.00 grams | 20.60 grams |
| catalyst solution #1 | 0.90 grams | 0.90 grams |
| sealer paste #1 | 221.78 grams | 221.78 grams |
| Total | 265.90 grams | 270.21 grams |

| | sealer #3 without RUU | sealer #4 with RUU |
|---|---|---|
| composite #1 | 8.20 grams | 8.20 grams |
| acrylic resin #1 | 9.20 grams | 0.00 grams |
| RUU #2 | 0.00 grams | 10.92 grams |
| sealer paste #2 | 147.94 grams | 147.94 grams |
| Total | 165.34 grams | 167.06 grams |

| | sealer #5 without RUU | sealer #6 with RUU |
|---|---|---|
| composite #1 | 76.66 grams | 76.66 grams |
| acrylic resin #2 | 19.79 grams | 0.00 grams |
| RUU compound #2 | 0.00 grams | 18.79 grams |
| sealer paste #3 | 139.51 grams | 139.51 grams |
| methyl n-amyl ketone | 0.00 grams | 1.00 grams |
| Total | 235.96 grams | 235.96 grams |

Topcoat #1

Following tinting bases (available commercially from high solid Solo line from BASF) were mixed with agitation: 91.0 gms of HS11, 331.0 gms of HS82, 281 gms of HS83, 15 gms of HS25, 35 gms of HS 90 and 247 gms of HS72. The bases were mixed for 10 minutes till homogenious mixture.

Topcoat #2

The following materials including tinting bases (commercially available from H S Solo line of BASF) were mixed with agitation. 74.85 grams of HS11, 373.5 grams of HS40, 235.0 grams of HS44, 111.42 grams of HS25 and 30.12 grams of HS90 were mixed for ten minutes till homogenious mixture.

Other finished products used for the study, such as High Solids Tinting Base HS83 and HS44, Hardner DH-46 and SH28, reducer DR-43, reactive reducer RR38, pre-kleno 901, etc. are commercially available from BASF.

Reactive Diluent #1

Reactive diluent #1 is the XP7052E (formerly known as LS2973E) from Miles.

Experimental

Polished Cold roll steel panels were used. The panels were primed with commercially available epoxy primer DE15 from BASF, using hardner and reducer as recommended by the supplier. The panels were baked for 30'@ 140° F. and wet sanded with 400 grit sand paper. Panels were Clean wiped with pre-kleno 901.

All the sealers were sprayed using HVLP gun (with the pressure of 10 psi at the tip) with the dry film build of 1.1 to 1.3 mils. The isocyanate index was kept 1.1 with 10% excess isocyanate inall the cases. For each comparable set i.e. with and without RUU, sealers were sprayed at the same viscosity. Pot life and VOC were measured. Dry time was recorded (on glass plate) using Byk Dry Recorder. Respective topcoats were applied after 10, 15, 20, 25 and 30 minutes (varies with each set of examples) flash of sealers, wet on wet over the sealer, using HVLP gun. For comparative example #1 and 2, the ratio of topcoat #1/ hardener DH 46/ Reducer 43 was 4/1/1 by volume. For comparative examples #3, #4 and #5, #6, the ratio of topcoat #2/ hardener SH28/ reacive reducer RR38 was 3/1/1 by volume. The panels were baked for 30'@ 140° F. and aged overnight at room temperature before testing.

COMPARATIVE COATING EXAMPLE #1 and #2

Low VOC Automotive Tintable Sealer, With and Without Reactive Urea-urethane Compound (RUU)

| | sealer #1 Without RUU | | | sealer #2 With RUU | | |
|---|---|---|---|---|---|---|
| Sealer | 265.90 grams | | | 270.21 grams | | |
| Tinting Base HS-83 | 42.74 grams | | | 42.74 grams | | |
| Isocyanate hardener #1 | 45.11 grams | | | 45.11 grams | | |
| Reducer #1 | 44.20 grams | | | 41.00 grams | | |
| Initial Viscosity at spray (ford #4 cup) | 23.0 seconds | | | 23.0 seconds | | |
| VOC at spray | 3.57 | | | 3.59 | | |
| Isocyanate Index | 1.1 | | | 1.1 | | |
| sealer dry time | 70 minutes | | | 45 minutes | | |
| Test results of top coated panels | | | | | | |
| Panel # | (A) | (B) | (C) | (A) | (B) | (C) |
| Flash time of sealer | 15' | 20' | 25' | 15' | 20' | 25' |
| Stike-in Resistance of top coat | poor | poor | good | good | good | good |
| 20° Gloss | 68 | 75 | 86 | 84 | 87 | 86 |
| DOI of topcoat | 70 | 70+ | 80+ | 80+ | 80+ | 80+ |
| Initial Adhesion humidity (24 hrs) | passes For panel # (C) | | | passes For panel # (A,B,C) | | |
| Blisters/adhesion | None/passes | | | None/passes | | |

COMPARATIVE COATING EXAMPLE #3 and #4

Low VOC Automotive Tintable Sealer Using Reactive Diluent With and Without Reactive Urea-urethane Compound (RUU)

| | sealer #3 Without RUU | | | sealer #4 With RUU | | |
|---|---|---|---|---|---|---|
| Sealer | 165.34 grams | | | 167.06 grams | | |
| Tinting Base HS-44 | 30.72 grams | | | 30.72 grams | | |
| Reactive Diluent #1 | 24.42 grams | | | 24.42 grams | | |
| Isocyanate hardener #2 | 40.10 grams | | | 39.22 grams | | |
| Reducer #2 | 34.80 grams | | | 33.60 grams | | |
| Initial Viscosity at spray (ford #4 cup) | 23.0 seconds | | | 23.0 seconds | | |
| pot life (2 × init. vis) | 1.75–2.0 hours | | | 2.0 hours | | |
| VOC at spray | 3.26 | | | 3.28 | | |
| Isocyanate Index | 1.1 | | | 1.1. | | |
| sealer dry time | 113 minutes | | | 80 minutes | | |
| Test results of top coated panels | | | | | | |
| Panel # | (A) | (B) | (C) | (A) | (B) | (C) |
| Flash time of sealer | 20' | 25' | 30' | 20' | 25' | 30' |
| Stike-in Resistance | poor | poor | good | good | good | good |
| 20° Gloss | 70 | 75 | 86 | 86 | 87 | 86 |
| DOI of topcoat | 70 | 70+ | 80+ | 80 | 80+ | 85 |
| Initial Adhesion humidity (24 hrs) | passes For panel # (C) | | | passes For panel # (A,B,C) | | |
| Blisters/adhesion | None/passes | | | None/passes | | |

COMPARATIVE COATING EXAMPLE #5 and #6

Low VOC Automotive Tintable Sealer, With and Without Reactive Urea-urethane Compound (RUU)

|  | sealer #5 Without RUU | | | sealer #6 With RUU | | |
| --- | --- | --- | --- | --- | --- | --- |
| Sealer | 235.96 grams | | | 235.96 grams | | |
| isocyanate hardener #3 | 33.00 grams | | | 33.30 grams | | |
| Reducer #2 | 19.10 grams | | | 19.00 grams | | |
| Initial Viscosity at spray (ford #4 cup) | 21.0 seconds | | | 21.0 seconds | | |
| pot life (2 × init. vis) | 4.75 hours | | | 5.25 hours | | |
| VOC at spray | 4.01 | | | 4.00 | | |
| Isocyanate Index | 1.1 | | | 1.1 | | |
| sealer dry time | 40 minutes | | | 23 minutes | | |
| Test results of top coated panels | | | | | | |
| Panel # | (A) | (B) | (C) | (A) | (B) | (C) |
| Flash time of sealer | 10' | 15' | 20' | 10' | 15' | 20' |
| Stike-in Resistance of top coat | poor | poor | good | poor | good | good |
| 20° Gloss | 65 | 75 | 87 | 75 | 87 | 86 |
| DOI of topcoat | 65 | 70+ | 80 | 75+ | 80 | 80 |
| Initial Adhesion | passes | | | passes | | |
| humidity (24 hrs) | For panel # (C) | | | For panel # (B,C) | | |
| Blisters/adhesion | None/passes | | | None/passes | | |

In above comparative examples #1–#2, #3–#4 and #5–#6, the sealers with the RUU compounds dry faster than the ones without RUU compounds. As shown the the examples, VOC's as well as pot life had not been affected. In all the cases, the sealers with the RUU compounds achieves srike-in resistance earlier than the "control"'s wihtout RUU compounds. This effect is reflected in the 20° Gloss and DOI results. All the panels had good initial adhesion. The results of humidity exposure of the coating film for 24 hours for the topcoated sealers #2, 4 and 6 which achieved earlier strike-in resistance, were comparable to their "controls" which required longer flash time for the sealer to dry enough to achieve the strike-in resistance.

Dry time as recorded by Byk Recorder, gives the information about dust free time (used for topcoats, clearcoat) or thourough dry. Although the sealers do not need to be "dust free" or completely dried to avoid strike-in resistance for wet on wet application, the results in the examples were recorded to demonstrate the difference in the dry time for the sealers with and without RUU compounds. These results clearly shows that the sealers with RUU compounds dries faster than the ones without it.

We claim:

1. A coating composition comprising a mixture of
   a) 5–40 percent by total weight of a crosslinkable co-vehicle comprising a polymer which is the polymerization product of monomers selected from the group consisting of acrylate and methacrylate hydroxyl functional monomers and other vinyl monomers, said polymer having a glass transition temperature between about −3° C. to about 35° C. (using the Fox method of Tg calculation), a weight average molecular weight of 1,000 to 7,000 and a hydroxyl value of between 75 and 175 mg KOH/g,
   b) 10 to 50 percent by total weight of an organic solvent,
   c) 1 to 60 percent by total weight of a reactive urea-urethane compound comprising reactive functionality other than —NCO groups thereon and consisting of the reaction product of alkanolamine, di- or polyisocyanate and aliphatic alcohol,
   d) 0 to 30 percent by total weight of a reactive diluent,
   e) 10 to 50 percent by total weight of isocyanate cross linker,
   f) 0 to 10 percent by total weight of additives, selected from the group consisting of rheology control additives, flow modifiers, curing catalysts, accelerators, anti-settling agents, wetting agents, dispersing agents, mar and slip agents and mixtures thereof,
   h) 10 to 60 percent by total weight of pigments.

2. The coating composition of claim 1 wherein the crosslinkable covehicle is an acrylic polymer further comprising glycidyl groups and the polymer is subsequently reacted to a fatty acid through said glycidyl groups.

3. The coating composition of claim 1 wherein the crosslinkable covehicle comprising an acrylic polymer comprises the polymerization product of ethylenically unsaturated acrylate and methacrylate monomers containing hydroxyl groups and other vinyl monomers, wherein the resulting acrylic polymer is subsequently esterified by means of reaction with natural or synthetic fatty acids.

4. The coating composition of claim 1 wherein the reactive urea/urethane compound consists of the reaction product of a polyisocyanate selected from the group consisting of the isocyanurate of isophorone diisocyante and the isocyanurate of hexamethylene diisocyanate and an alkanolamine with structure

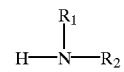

where $R_1$ is selected from the group consisting of alkyl, cycloaliphatic and benzylic moieties, each containing a hydroxyl group, $R_2$ is selected from the group consisting of hydrogen, alkyl, cycloaliphatic and benzylic moieties, each with or without a hydroxyl group, and where $R_1$ and $R_2$ combined comprise up to 12 carbon atoms.

5. The coating composition of claim 4 wherein the reactive urea/urethane compound has a weight average molecular weight between 2050 and 6000, as measured by gel permeation chromatography relative to polystyrene standards.

6. The coating composition of claim 1 wherein the crosslinkable covehicle is an acrylic polymer further comprising organic acid groups and the polymer is subsequently reacted to an oxirane functional compound through said organic acid groups on the polymer.

7. A method for improving dry time of an ambient cure pigmented coating composition comprising the steps of
   (A) applying over a primer coated substrate a pigmented coating composition to a thickness of between 1.1 to 1.3 mils, said coating comprising
      a) 5–40 percent by total weight of a crosslinkable covehicle comprising a polymer which is the polymerization product of monomers selected from the group consisting of acrylate and methacrylate hydroxyl functional monomers and other vinyl monomers, said polymer having a glass transition temperature between about −3° C. to about 35° C. (using the Fox method of Tg calculation), a weight average molecular weight of 1,000 to 7,000 and a hydroxyl value of between 75 and 175 mg KOH/g, b) 10 to 50 percent by total weight of an organic solvent,
c) 1 to 60 percent by total weight of a reactive urea/urethane compound, comprising reactive functionality other than —NCO groups and comprising the reaction product of an alkanolamine with structure

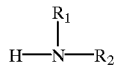

where
R$_1$ is selected from the group consisting of alkyl, cycloaliphatic and benzylic moieties, each containing a hydroxyl group,
R$_2$ is selected from the group consisting of hydrogen, alkyl, cycloaliphatic and benzylic moieties, each with or without a hydroxyl group, and
where R$_1$ and R$_2$ combined comprise up to 12 carbon atoms,
d) 0 to 30 percent by weight of a reactive diluent,
e) 10 to 50 percent by total weight of isocyanate crosslinker,
f) 0 to 10 percent by total weight of additives, selected from the group consisting of rheology control additives, flow modifiers, curing catalysts, accelerators, anti-settling agents, wetting agents, dispersing agants, mar and slip agents and mixtures thereof, and
g) 10 to 60 percent by total weight of pigments,
B) flash drying the pigmented coating for between 10 and 30 minutes at 140° F.,
C) applying a non-pigmented coating composition wet on wet to the pigmented coating,
D) heating the substrate at 140° for 30 minutes,
E) air drying the coating at ambient temperatures to achieve a reduction in dust free dry time as measured on a Byk Recorder of between 57% to 70% when compared to an identical coating composition without component (c).

* * * * *